US012488353B2

(12) United States Patent
Pasumarthi

(10) Patent No.: US 12,488,353 B2
(45) Date of Patent: Dec. 2, 2025

(54) USING ARTIFICIAL INTELLIGENCE ("AI") TO CUSTOMIZE CALL CENTER QUESTIONS FOR USE WITH CUSTOMER AUTHENTICATION TECHNIQUES

(71) Applicant: Bank of America Corporation, Charlotte, NC (US)

(72) Inventor: Kalyan V. Pasumarthi, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 75 days.

(21) Appl. No.: 18/438,770

(22) Filed: Feb. 12, 2024

(65) Prior Publication Data

US 2025/0259184 A1 Aug. 14, 2025

(51) Int. Cl.
*G06Q 30/015* (2023.01)
*G06N 5/02* (2023.01)
*H04L 9/40* (2022.01)

(52) U.S. Cl.
CPC ............ *G06Q 30/015* (2023.01); *G06N 5/02* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 2014/0310513 A1* | 10/2014 | Barney | H04L 9/0841 713/153 |
| 2016/0226830 A1* | 8/2016 | Steeves | H04L 9/0894 |
| 2017/0324717 A1* | 11/2017 | Kravitz | H04L 63/08 |
| 2020/0126441 A1* | 4/2020 | Garg | H04L 9/3297 |
| 2023/0006825 A1* | 1/2023 | Moore | H04L 9/0825 |
| 2023/0187036 A1* | 6/2023 | Gnanasambandam | G16H 50/70 705/3 |

* cited by examiner

*Primary Examiner* — Raqiul A Choudhury
(74) *Attorney, Agent, or Firm* — Weiss & Arons LLP

(57) ABSTRACT

Systems and methods for supporting artificial intelligence ("AI") customer service interactions between a customer service agent operating on an AI platform at a call center and a customer using an AI customer device are provided. Methods may include activating an AI session between the customer service agent and the customer. Methods may include authenticating the AI session between the customer service agent and the customer. Methods may include receiving a selection of AI questions from the AI platform and receiving answers to those AI questions via the AI customer device. Methods may include processing a co-browsing AI session request. Methods may include initiating the AI session between the customer service agent and the customer based on authentication of the answers to the AI questions.

20 Claims, 6 Drawing Sheets

USING ARTIFICIAL INTELLIGENCE ("AI") TO CUSTOMIZE CALL CENTER QUESTIONS FOR USE WITH CUSTOMER AUTHENTICATION TECHNIQUES

FIELD OF TECHNOLOGY

Aspects of the disclosure relate to artificial intelligence ("AI"). Specifically, this disclosure relates to using AI for customer authentication.

BACKGROUND OF THE DISCLOSURE

A customer service agent may engage a customer via a platform, e.g., a call center, or any other suitable platform. The engagement may include one or more phone calls between the customer service agent and the customer. The engagement may also include a question-and-answer exchange between the customer service agent and the customer. The engagement may also include a question-and-answer approval between the customer service agent and the customer.

The phone call communications, the question-and-answer exchange, and the question-and-answer approval may be time and resource consuming. Specifically, the question-and-answer approval may involve transmitting questions from the customer service agent to the customer, receiving answers from the customer, and verifying the answers for approval. The question-and-answer exchange may be via telephone, email, physical mail, in person, or any other means.

Typically, the customer service agent may be required to ask a customer many questions to verify customer authenticity. The customer service agent would usually need advanced training to enable this enhanced level of customer service and interaction.

To reduce challenges associated with customer engagement, it would therefore be desirable to harness the advantages of AI to reduce the number of questions needed to authenticate the customer. It would also be desirable to enable more rapid customer engagement using AI.

But there are significant challenges associated with utilizing AI to perform customer engagement. These challenges may include protecting non-public information ("NPI") made available during an AI session. Additionally, these challenges may include enabling a customer to upload and/or attest to documents within the AI session. Finally, challenges may include generating appropriate questions for customer engagement and authentication. Therefore, it would be desirable to utilize an AI platform designed to protect NPI from viewing by certain users during the AI session. Additionally, it would be desirable for the AI platform to enable document upload and/or customer attestation. Finally, it would be desirable for the AI platform to customize questions to assist with call center customer authentication.

SUMMARY OF THE DISCLOSURE

Systems and methods for supporting an AI customer service interaction between a customer service agent and a customer are provided. A customer service agent may be an AI-based customer service agent.

Systems and methods may include an AI platform. The AI platform may use generative AI and machine learning ("ML"). Generative AI and ML may reduce customer authentication questions required during a call center session.

A customer service agent may be required to authenticate each person calling a customer service call center. The customer service agent may be required to determine whether the customer calling is an authorized customer.

Customer authentication may also be required for customers who physically walk into financial centers. A customer service agent may be required to authenticate each person walking into a customer service center. The customer service agent may be required to determine whether the customer calling is an authorized customer.

The customer service agent may use the AI platform. The AI platform may collect information from a customer. The customer information may already be compiled by the AI platform. The customer information may include data from past customer interactions.

The AI platform may collect information from previous customer experiences at the call center. The AI platform may build intelligent models and use AI to generate questions for future customer encounters. Thus, fewer, and more pertinent questions may be asked by the customer service agent of a person identifying as the customer.

The AI platform may generate customized questions for customer service agents to ask customers. A customer service agent's question may be based on a customer's answer to a previous question. For example, a customer service agent may ask a customer the following question: "Where did you shop last Sunday?" Based on the customer's answer (e.g., the local mall), the customer service agent may customize additional questions to obtain customer authentication. For example, the customer service agent may ask the customer: "What did you purchase?" and "What was the cost of the item(s)?" If the customer answers the AI platform questions correctly, the customer may be properly authenticated. If the customer answers the AI platform questions incorrectly, the customer may be asked additional questions for further authentication. It should be noted that the sequence and content of the questions may be developed using AI-based algorithms.

The AI platform may run applications (e.g., AI applications). Merchants may use the AI platform to generate and ask customized questions for customers. Customer service agents may ask customers to provide customer details online. Customer service agents may ask customers to provide customer details offline. The AI platform may allow real-time generation of customer questions. The AI platform may require less training for customer service agents.

The AI platform may use generative AI. The AI platform may use generative AI to obtain customer information. The AI platform may use generative AI to obtain answers to customer questions for higher interactive voice response ("IVR"). IVR systems are systems that optimize IVR. IVR systems may allow customers to interact with a computer-operated system using voice and dual-tone multi-frequency ("DTMF") tones input with a keypad. IVR systems may allow customers to interact with a company's host system via a telephone keypad and/or by speech recognition. Afterward, IVR systems may allow customized customer questions through IVR dialogue.

IVR systems may respond with pre-recorded and/or dynamically generated audio to further direct customers on how to proceed. IVR systems deployed in the network may be sized to handle large call volumes. IVR systems may be used for inbound calling. IVR systems may be used for outbound calling.

Financial institutions may rely on IVR systems for customer engagement. Financial institutions rely on IVR systems to produce continuous, real-time customer support at any time. IVR systems may allow customers to check balances and transaction histories. IVR systems may allow customers to make payments and transfers. IVR systems may allow for increased customer engagement and customer satisfaction.

IVR systems may be used as standalone systems to create self-service solutions for mobile purchases, banking payments, services, retail orders, utilities, travel information, and weather conditions. By using an IVR system in combination with generative AI, call center routing may be optimized for customer experience and workforce efficiency.

The AI platform may leverage customer authentication and/or authorization with AI. The AI platform may grant customers different levels of authorization. For example, one level of authorization may be for wire transfers. A different level of authorization may be for some other type of transaction (e.g., applying for a mortgage, a line of credit, a loan, or a bank account).

The AI platform may use multistage authentication and/or authorization. For example, the AI platform may authorize one type of transaction first (e.g., the ability to upload documents). The AI platform may then authorize a different type of transaction (e.g., a wire transfer).

The system may include an AI platform. The AI platform may be co-located with the customer service agent. As such, the AI platform and the customer service agent may be located at the same location. Both the AI platform and the customer service agent may be associated with an entity. As such, co-located may be understood to mean, in certain circumstances, located at locations associated with an entity. The AI platform may provide AI questions for both customer service agents and customers.

The system may also include an AI customer device. The AI customer device may be co-located with the customer. The AI customer device may be any suitable device that provides AI capabilities for the customer. Examples of such AI customer devices may include an AI customer device, a computer processor, an AI graphical user interface ("GUI"), or any other suitable device.

The AI customer device may run, or execute, an AI application. The AI application may be in communication with the AI customer device. The AI application may be in communication with the AI platform. As such, the AI application may be a link between the AI platform and the AI customer device. Therefore, the AI application may enable exchange of information between the AI platform and the AI customer device.

Upon detection of a security failure, reactivation may be requested. The customer may be barred from AI communications until the reactivation is executed.

Upon activation and authentication, further AI communications may involve creating a bank account. Upon activation and authentication, further AI communications may involve applying for a mortgage. Upon detection of a security failure, reactivation and reauthentication may be requested. The customer may be barred from AI communications until the reactivation and reauthentication are executed.

A customer AI session activation process may include the customer service agent communicating with the AI application. The customer service agent may request a set of know your customer ("KYC") information from the customer. The KYC information may include information pertaining to the customer, such as name, address, mobile device identifier, mobile telephone number and any other suitable KYC information.

The customer service agent may request the set of KYC information from the customer. The AI application may receive the set of KYC information from the customer. The AI application may provide the set of KYC information to the customer service agent. The AI platform may receive a login request from the customer using the AI application and the AI customer device.

The AI platform may be configured to authenticate a customer associated with the AI customer device. The AI platform may authenticate the customer via an authentication. The authentication may include the AI platform transmitting a one-time password ("OTP") to the AI customer device. The authentication may also include the AI platform receiving the OTP once it has been received, read, and entered by the customer on the AI customer device.

Upon authentication, the AI platform may retrieve a first list of AI questions for selection by the AI platform. Each list of AI questions may be personalized for the customer. The AI platform may host, for example, approximately 50-60 AI questions. However, each list may only include AI questions that are pertinent to the customer. Therefore, each list retrieved for the customer may include, for example, 5-10 AI questions. The AI platform may select a first AI question from the first list of AI questions. The AI platform may transmit the selected first AI question to the AI customer device for answering by the customer.

The customer may provide a first answer to the selected first AI question. The customer may transmit the first answer, via the AI customer device, to the AI platform. The AI platform may receive the first answer from the customer via the AI customer device.

The AI platform may create a payload that includes session elements. The session elements may correspond to the first list of AI questions. Each AI question may include a set of generic session elements. Once the AI platform selects an AI question, the set of generic session elements may be copied and personalized for the customer. For example, if the AI platform selects a transfer funds question, generic session elements for a transfer funds session may be copied and the customer's specific account numbers may be populated into the session elements.

The AI platform may encrypt NPI session elements included in the session elements. As such, session elements that correspond to, or include, NPI, such as customer account number, social security numbers, passwords and such may be encrypted.

Upon encryption, the payload may be transferred from the AI platform to the AI customer device in communication with the AI application.

The payload and/or the encrypted portion of the payload may be decrypted at the AI customer device by the AI application. In some instances, the OTP may be used to decrypt the payload.

The AI application may be configured to authenticate the customer associated with the AI customer device. A first co-browsing AI session may be instantiated between the customer service agent and the customer via the AI application. The AI platform may instruct the AI application regarding the first co-browsing AI session.

An AI session request may include the AI application transmitting a login session request to the AI platform. The AI application may be in communication with the AI customer device. The login session request may include a plurality of authentication parameters. The plurality of authentication parameters may include at least a portion of the set of KYC data. The authentication parameters may include a port number, an International Mobile Equipment Identity ("IMEI") number, or a serial number associated with the AI customer device. The authentication parameters may include the geographical location of the AI customer device and/or the AI customer device. The authentication parameters may include customer details, such as social security number, date of birth and address, and any other suitable information. The authentication parameters may also include the location of an embedded supplementary chip and/or sensor.

The login session request transmitted to a customer authentication engine may operate on the AI platform. The customer authentication engine may authenticate the login session request. The customer authentication engine may utilize one or more of the authentication parameters to validate the login session request.

An authentication confirmation may be transmitted from the customer authentication engine to the AI customer device. The authentication confirmation may include the NPI session elements, the first list of AI questions, and the first answer. Generative AI and ML may analyze the NPI session elements, the first list of AI questions, and the first answer to generate a second list of AI questions.

A co-browsing AI session may include the AI platform retrieving the second list of AI questions. The AI platform may retrieve the second list of AI questions based on the NPI session elements, the first list of AI questions, and the first answer. The AI platform may select a second AI question from the second list of AI questions. The AI platform may transmit the second AI question to the AI customer device. The customer may input a second answer to the second AI question into the AI customer device. The AI customer device may transmit the second answer to the AI platform. The AI platform may authenticate the customer based on the second answer.

The AI platform may instantiate a second co-browsing AI session between the customer and the customer service agent. The second co-browsing AI session may enable the customer to provide one or more of the following: in-session attestation, enter information, upload documentation, and submit an application. The AI platform may instruct the AI application regarding the second co-browsing AI session.

During the co-browsing AI session, both the customer service agent and the customer may interact on the same screen. In order to protect the privacy of the NPI session elements that may be displayed on the screen, a shared display frame may include at least two frames. A first frame may be appropriated to the customer service agent. A second frame may be appropriated to the customer. The NPI session elements may be masked at the first frame. However, the NPI session elements may be viewable at the second frame.

At times, an additional customer service agent, such as a supervisor, and/or an additional customer agent, such as a co-signer may be added to the session. The shared display frame may generate an additional frame. The additional frame may correspond to the additional individual. NPI session elements may be masked partially, masked completely, or enabled to be viewed based on a permission set or permission-based hierarchy associated with the additional individual.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
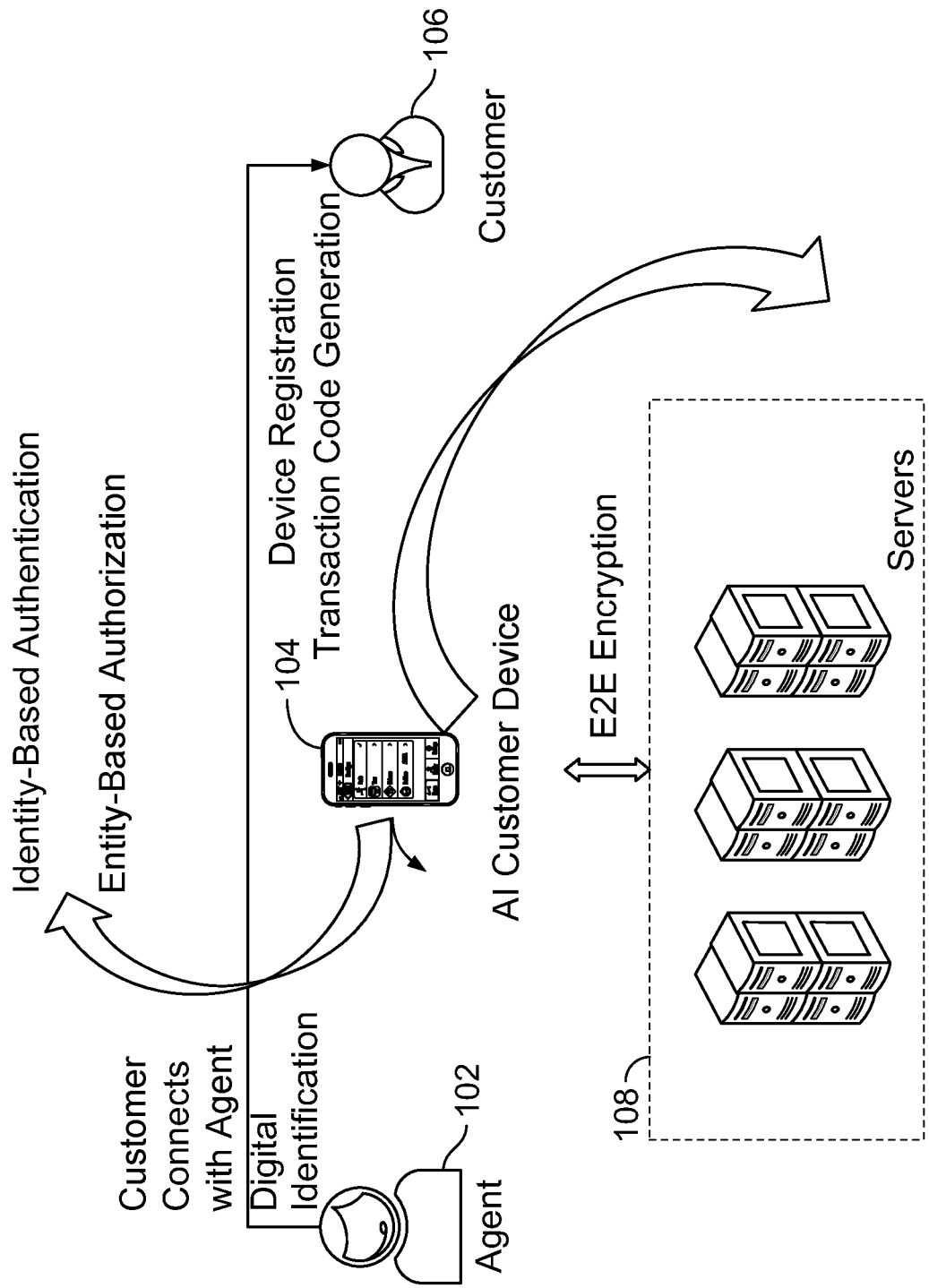
FIG. 1 shows an illustrative diagram in accordance with principles of the disclosure.

Systems and methods for supporting an AI customer service interaction between a customer service agent and a customer are provided. The customer service agent may operate on an AI platform. The AI platform may be associated with an entity. The customer may utilize an AI customer device and/or an AI customer device. The AI customer device may run an AI application. The AI application may enable communication between the AI customer device and the AI customer device.

Systems may include an AI platform. Systems may include an AI customer device. The AI customer device may run an AI application. The AI application may be in communication with the AI customer device. The AI application may be in communication with the AI platform.

The AI application may be configured to activate a customer AI session. The AI application may request a set of KYC information from a customer. The AI application may display on the AI customer device input fields for receiving the requested set of KYC information. The AI application may transmit to the customer service agent information input into the input fields.

The AI platform may authenticate a customer associated with the AI customer device by transmitting an OTP to the AI customer device. The AI platform may receive from the AI customer device an entered OTP. The AI platform may, upon OTP authentication, retrieve a first list of AI questions. The AI platform may select a first AI question from the first list of AI questions.

The AI platform may transmit the first AI question to the AI customer device. The AI platform may receive, from the AI customer device, a first answer to the first AI question. The AI platform may authenticate the customer based on the first answer. The AI platform may, in response to the customer authentication, create a payload that includes session elements.

The AI platform may encrypt non-public information ("NPI") session elements included in the session elements. The AI platform may transmit the payload to the AI customer device. The AI application may decrypt the NPI session elements included in the session elements within the payload.

The AI application may be configured to authenticate the customer associated with the AI customer device. The AI application may instantiate a first co-browsing AI session on the AI customer device and the AI platform. The AI platform may instruct the AI application. The AI application may transmit a login session request to the AI platform. The login session request may include a plurality of authentication parameters.

The AI platform may transmit the login session request to a customer authentication engine operating on the AI platform. The customer authentication engine may authenticate the login session request. An authentication confirmation, including the NPI session elements, the first list of AI questions, and the first answer, may be transmitted from the customer authentication engine to the AI application. The sequence and content of the first list of AI questions may be determined by an AI algorithm.

The AI algorithm may determine the content of each of later-in-list AI questions based on an answer received from an earlier-in-list AI question. A later-in-list AI question may stem from an earlier-in-list AI question. For example, an earlier-in-list AI question may be: "Were you born in New York?" The AI algorithm may then determine the content of a later-in-list question based on an answer to the earlier-in-list question (e.g., "Yes, I grew up in New York"). A later-in-list AI question may then be: "Up until what age did you grow up in New York?"

Based on the NPI session elements, the first list of AI questions, and the first answer, the AI platform may retrieve a second list of AI questions. The AI platform may select a second AI question from the second list of AI questions. The AI platform may transmit the second AI question to the AI customer device. The customer may input a second answer to the second AI question into the AI customer device.

The AI customer device may transmit the second answer to the AI platform. The AI platform may authenticate the customer based on the second answer. The AI platform may instantiate a second co-browsing AI session between the customer and the customer service agent.

The second co-browsing AI session may prompt the customer to provide one or more of a wire transfer, in-session attestation, enter information, upload documentation, and submit an application.

If answers to the first list of AI questions and the second list of AI questions are indeterminate, the AI algorithm may determine a third list of AI questions. The AI algorithm may determine the content of each of later-in-list AI questions based on an answer received from an earlier-in-list AI question. If answers to the third list of AI questions are indeterminate, the AI platform may instruct the user to contact a customer service agent.

Systems may include a display frame. A display frame may be shared during the co-browsing AI session. The display frame may include two frames. The first frame may be for the customer service agent and a second frame may be for the customer. The NPI session elements may be masked in the first frame, while the NPI session elements may be viewable in the second frame.

Systems may include additional customer service agents and customers added to the co-browsing AI session. Each additional customer service agent and customer added may be assigned a personal frame. The personal frame may enable viewing of a portion of the NPI session elements based on a permission set and permission-based hierarchy.

Systems may include, if authenticating the customer based on the first answer fails, the AI platform may be further configured to transmit the first list of AI questions to the AI customer device. Systems may include receiving from the AI customer device a first list of answers to the first list of AI questions. Systems may include authenticating the customer based on the first list of answers.

Systems may include, if authenticating the customer based on the second answer fails, the AI platform may be further configured to transmit the second list of AI questions to the AI customer device. Systems may include receiving from the AI customer device a second list of answers to the second list of AI questions. Systems may include authenticating the customer based on the second list of answers.

Systems may include, if authenticating the customer based on the second answer fails, the AI platform may be further configured to transmit a third list of AI questions to the AI customer device. The AI algorithm may determine the content of each of later-in-list AI questions based on an answer received from an earlier-in-list AI question. If answers to the third list of AI questions are indeterminate, the AI platform may instruct the user to contact a customer service agent.

Systems may include KYC information. The KYC information may include AI customer device identification information. Systems may include authentication parameters. The authentication parameters may include at least a portion of the set of KYC information. Systems may include a payload. The payload may be decrypted at the AI customer device by the AI application using the OTP. Systems may include, upon activation, further communications involving creating a bank account.

Systems may include, upon detection of a security failure, a reactivation may be requested. The customer may be barred from AI communications until the reactivation is executed. Systems may include, upon activation and authentication, further communications involving applying for a mortgage.

Systems may include, upon detection of a security failure, a reactivation and reauthentication may be requested. The customer may be barred from AI communications until the reactivation and reauthentication are executed.

Methods may include operating on an AI platform. Methods may include a customer using an AI customer device. The AI customer device may be running an AI application. The AI application may be enabling communication between the AI customer device and the AI platform.

Methods may include initiating a customer AI session activation process. Methods may include requesting a set of KYC information, by the customer service agent, from the customer via the AI application. Methods may include requesting, from the customer, the set of KYC information, by the AI application in communication with the AI customer device.

Methods may include receiving, from the customer, the set of KYC information, at the AI application. Methods may include transmitting, from the AI application, the set of KYC information, to the customer service agent at the AI platform.

Methods may include initiating, at the AI platform, a customer AI session authentication process. Methods may include transmitting an OTP to the AI customer device. Methods may include receiving from the AI customer device an entered OTP. Methods may include authenticating the OTP.

Methods may include retrieving a first list of AI questions. Methods may include selecting a first AI question from the first list of AI questions. Methods may include transmitting the first AI question from the AI platform to the AI customer device. Methods may include inputting into the AI customer device a first answer to the first AI question. Methods may include transmitting the first answer from the AI customer device to the AI platform. Methods may include authenticating the customer based on the first answer.

The sequence and content of the first list of AI questions may be determined by an AI algorithm. The AI algorithm may determine the content of each of later-in-list AI questions based on an answer received from an earlier-in-list AI question.

Methods may include creating a payload that includes a plurality of session elements. Methods may include encrypting NPI session elements included in the plurality of session elements. Methods may include transferring the payload to the AI customer device. Methods may include decrypting the payload at the AI customer device by the AI application.

Methods may include instantiating a first co-browsing AI session between the customer service agent and the customer. Methods may include transmitting, from the AI application to the AI platform, a login session request. The login session request may include a plurality of authentication parameters.

Methods may include forwarding the login session request to a customer authentication engine operating on the AI platform. Methods may include authenticating the login session request at the customer authentication engine.

Methods may include transmitting, from the customer authentication engine to the AI application, an authentication confirmation, the authentication confirmation comprising the list of AI questions. Methods may include providing, based on the NPI session elements, the first list of AI questions, and the first answer, a second list of AI questions. Methods may include selecting a second AI question from the second list of AI questions.

The sequence and content of the second list of AI questions may be determined by an AI algorithm. The AI algorithm may determine the content of each of later-in-list AI questions based on an answer received from an earlier-in-list AI question.

Methods may include transmitting from the AI platform to the AI customer device the second AI question. Methods may include inputting a second answer to the second AI question into the AI customer device.

Methods may include transmitting the second answer from the AI customer device to the AI platform. Methods may include authenticating, at the AI platform, the customer based on the second answer. Methods may include instantiating, at the AI platform, a second co-browsing AI session between the customer and the customer service agent.

Methods may include KYC information being received at the AI customer device via information input into the AI customer device. Methods may include prompting the customer to provide a wire transfer, in-session attestation, enter information, upload documentation, and submit an application during the co-browsing AI session.

Methods may include masking NPI session elements, included in the first co-browsing AI session, for the customer service agent. Methods may include making viewable NPI session elements, included in the first co-browsing AI session, for the customer.

Methods may include, if authenticating the customer based on the first answer fails, transmitting the first list of AI questions to the AI customer device. Methods may include receiving from the AI customer device a first list of answers to the first list of AI questions. Methods may include authenticating the customer based on the first list of answers.

Methods may include, if authenticating the customer based on the second answer fails, transmitting the second list of AI questions to the AI customer device. Methods may include receiving from the AI customer device a second list of answers to the second list of AI questions. Methods may include authenticating the customer based on the second list of answers.

Methods may include, if authenticating the customer based on the second answer fails, transmitting a third list of AI questions to the AI customer device. The AI algorithm may determine the content of each of later-in-list AI questions based on an answer received from an earlier-in-list AI question. If answers to the third list of AI questions are indeterminate, the AI platform may instruct the user to contact a customer service agent.

Methods may include KYC information including AI customer device identification information. Methods may include authentication parameters including at least a portion of the set of KYC information. Methods may include, upon activation, further communications involving creating a bank account.

Methods may include, upon a security failure, a reactivation may be requested. The customer may be barred from AI communications until the reactivation is executed. Methods may include, upon activation and authentication, further communications involving applying for a mortgage.

Systems and methods described herein are illustrative. Systems and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. A customer may be, e.g., onboarded to a digital wealth platform using an AI platform. Implementing AI in, for example, an onboarding session using an AI platform may provide a range of AI questions to a customer. Various technical aspects associated with AI may be harnessed in order to accelerate and reduce wasted time and resources associated with the wealth onboarding process. The AI platform may protect data in transit between the customer service agent and the customer.

At times, multiple customer service avatars/agents with multiple permission sets may be involved in a co-browsing AI session. As such, each of the customer service avatars/agents may have a different set of permissions for viewing NPI session elements associated with the customer. Therefore, the AI system may have a masking module. The masking module may consider the NPI session elements with respect to the permissions of the viewing agent.

Customer 106 may initiate communication with agent 102. At times, agent 102 may initiate communication with customer 106. The communication may utilize an application, such as an AI application as a communication medium. The application may be executed on an AI customer device 104. The AI customer device 104 may be associated with the customer 106. The application may communicate with a server 108 associated with agent 102. An AI platform associated with, or co-located with, agent 102 may communicate with an AI customer device associated with, or co-located with, the customer. The server 108 may communicate with an AI customer device associated with, or co-located with, the customer. The server 108 may communicate with an AI platform associated with, or co-located with, agent 102. Therefore, the AI application and the server may link the AI customer device 104 associated with customer 106 to AI platform associated with agent 102.

Upon communication initiation between customer 106 and agent 102, a digital identification of customer 106 may be initiated. The digital identification may involve registering the AI customer device 104 associated with customer 106. The digital identification may also involve generating and authenticating the registered device and/or the AI customer device using an OTP. As such, the digital identification may perform identity-based authentication (e.g., authentication of the individual using the AI customer device and/or AI customer device 104 associated with customer 106 and authentication of permissions associated with the individual using the AI platform associated with agent 102). The digital identification may also perform entity-based authorization (e.g., authorization of the permissions associated with the individual using the AI customer device 104 and/or AI customer device 104 associated customer 106 and authorization of permissions associated with the individual using the AI platform associated with agent 102.

Upon digital identification, the system may initiate device registration. Device registration may pull device registration information. Device registration information may be stored at server 108. An E2E ("end-to-end") encryption module may ensure that the communications between customer 106 and associated devices and agent 102 and associated devices are encrypted with an end-to-end encryption algorithm.

There may also be a transaction code generation during the device registration. The transaction code may be required to encrypt and decrypt the information using the E2E encryption module.

Figure 2:
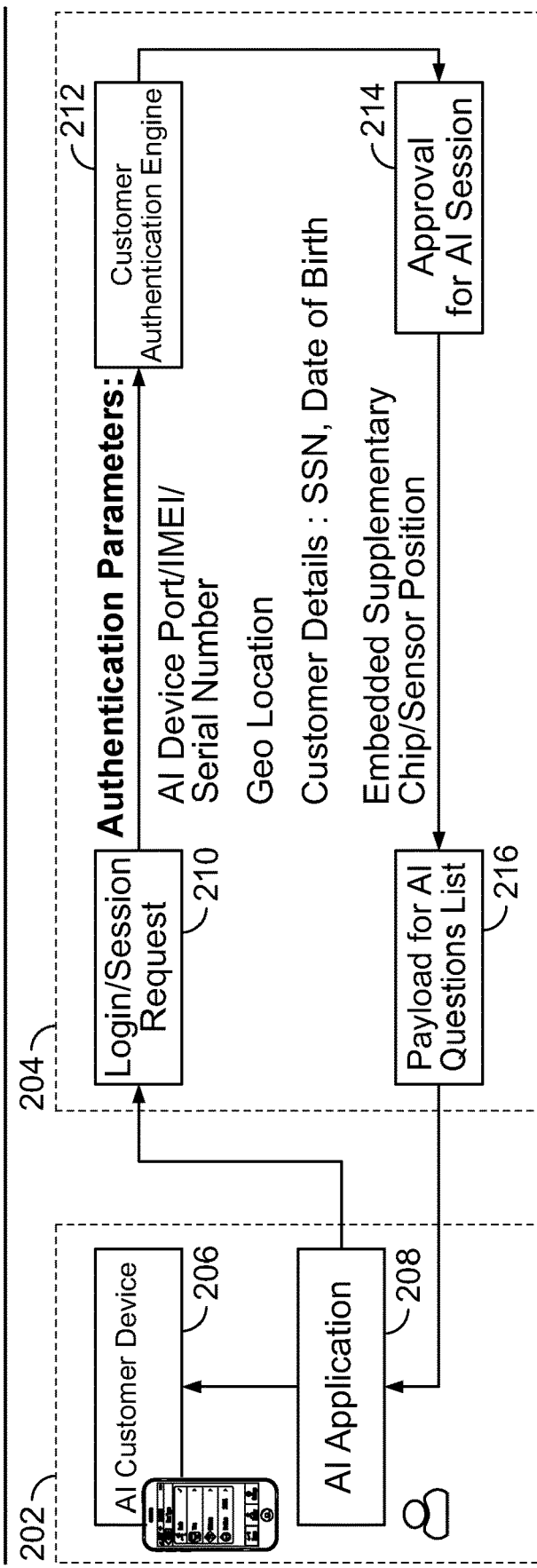
FIG. 2 shows an illustrative flow chart in accordance with principles of the disclosure.

FIG. 2 shows an illustrative flow chart. The illustrative flow chart shows a customer AI session request with secure AI interaction.

Box 202 corresponds to activities being executed on the customer side, while box 204 corresponds to activities being executed on the agent side.

The customer may utilize AI customer device 206 and AI application 208. AI customer device 206 may be linked to the customer's mobile device. As such, AI customer device 206 may be linked to AI application 208.

AI application 208 may initiate a login/session request. The login session request may include a request for an AI session. The login/session request may include a plurality of authentication parameters. The plurality of authentication parameters may be entered at the customer side. The plurality of authentication parameters may include for example, an AI customer device port number, an AI customer device IMEI number, an AI customer device serial number, a geographical location associated with the AI customer device and/or the AI customer device, customer details, such as social security number and date of birth, embedded supplementary chip position and sensor position.

The login/session request, including the authentication parameters, may be transmitted to an agent-side server. The login/session request at the agent side server may be shown at 210. The login/session request, including the authentication parameters, may be transmitted to customer authentication engine 212. Customer authentication engine 212 may validate the customer based on the authentication parameters.

Upon authentication of the customer authentication engine 212, an approval for an AI session may be issued at the agent side, as shown at 214. Upon approval of the AI session, a payload for AI questions list, shown at 216, may be transmitted to AI application 208. The payload for AI questions list may include a list of available AI questions for selection by the customer. Payload for AI questions list 216 may be transmitted to AI application 208.

Figure 3:
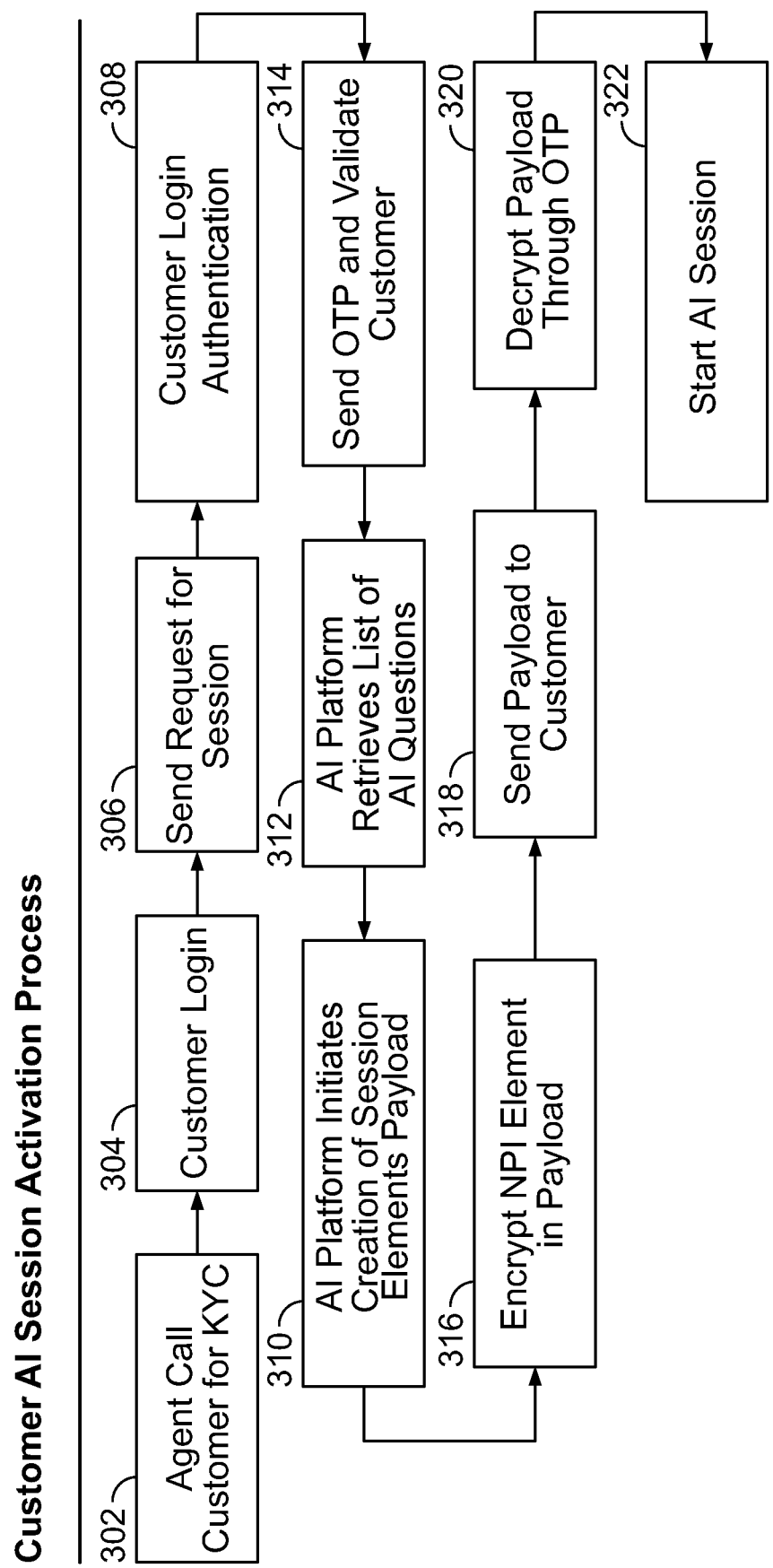
FIG. 3 shows another illustrative flow chart in accordance with principles of the disclosure.

FIG. 3 shows an illustrative flow chart. The illustrative flow chart shows a customer AI session activation process. The customer AI session activation process may include a customer service agent calling a customer for KYC information, as shown at 302. The customer service agent's call to the customer may utilize email, telephone, an online portal, a chat, or any other suitable communication method.

Upon receipt of the KYC information, a customer may login to an AI platform, as shown at 304. Upon a successful login of the customer to the AI platform, the customer may send a request for a session, as shown at 306. The request may be transmitted via the platform.

Upon transmission of the request, an authentication of the customer login vis-à-vis the session request may be initiated, as shown at 308. The AI platform may transmit an OTP and validate the customer, as shown at 314. The AI platform may retrieve a list of AI questions, as shown at 312. The AI platform may initiate creation of session elements payload, as shown at 310. The session elements payload may be based on an AI question selected by the AI platform. NPI session elements within the payload may be encrypted, as shown at 316. The payload may be transmitted to the customer, as shown at 318. The payload may be decrypted, as shown at 320. At times, the payload may be decrypted using the OTP. Upon decryption, a co-browsing AI session may be initiated, as shown at 322.

Figure 4:
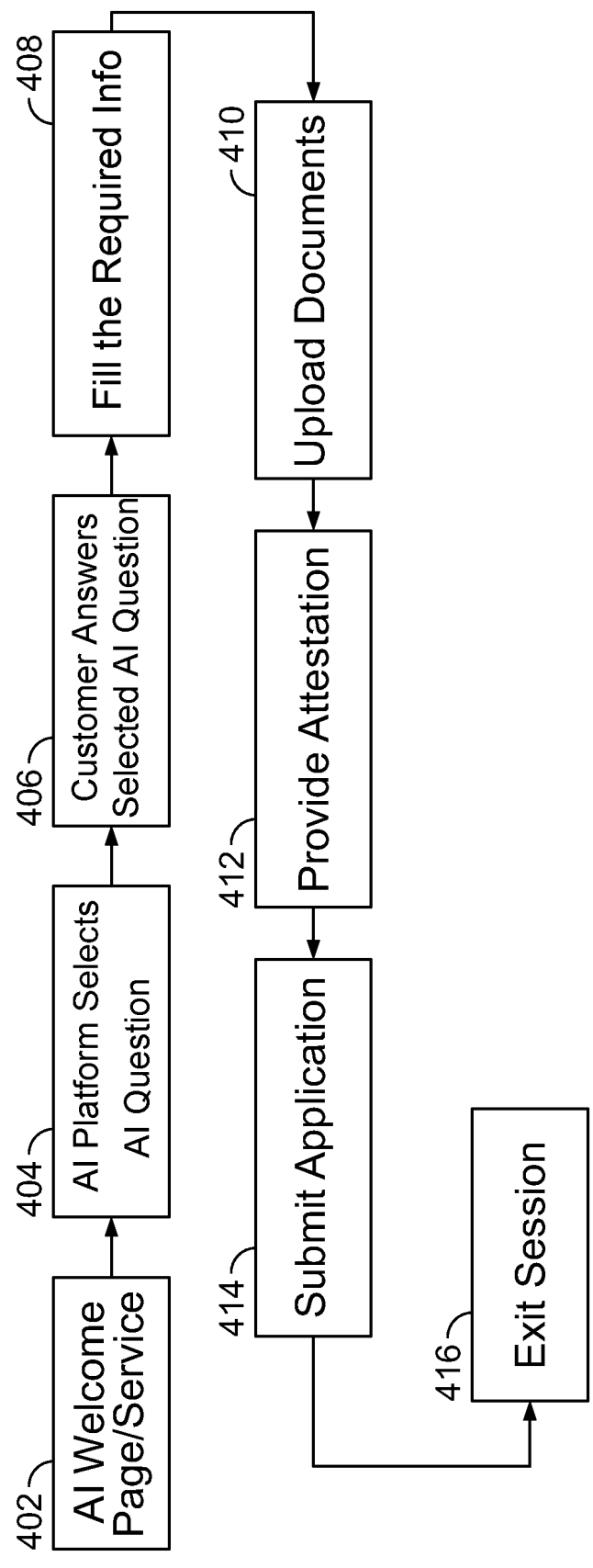
FIG. 4 shows yet another illustrative flow chart in accordance with principles of the disclosure.

FIG. 4 shows an illustrative flow chart. The illustrative chart shows an interaction between a customer and an AI agent. The AI agent may represent a live customer service agent. The AI agent may also represent a computer-based robot. At times, the AI agent may be represented by a robot, and in the event that the robot is unable to satisfy the needs of a customer, a live customer service agent may replace the robot.

The interaction between a customer and the AI agent may be initiated at an AI welcome page, as shown at 402. The AI webpage may include a variety of AI questions for selection by the AI platform.

The AI platform may select an AI question from the AI webpage, as shown at 404. The customer may answer the selected AI question, as shown at 406. The customer may input the answer into the AI customer device. The AI customer device may transmit the answer to the AI platform. Thus, an AI session may be instantiated between the customer and the AI agent.

Once an AI session has been instantiated between the customer and the AI agent, the customer may perform one or more tasks. The one or more tasks may include filling in the required information, as shown at 408, uploading documents, as shown at 410, providing attestation (e.g., signing and/or approving documents during the AI session), as shown at 412 and submitting an application, as shown at 414. Upon completion of the one or more tasks, the customer may exit the session, as shown at 416.

Figure 5:
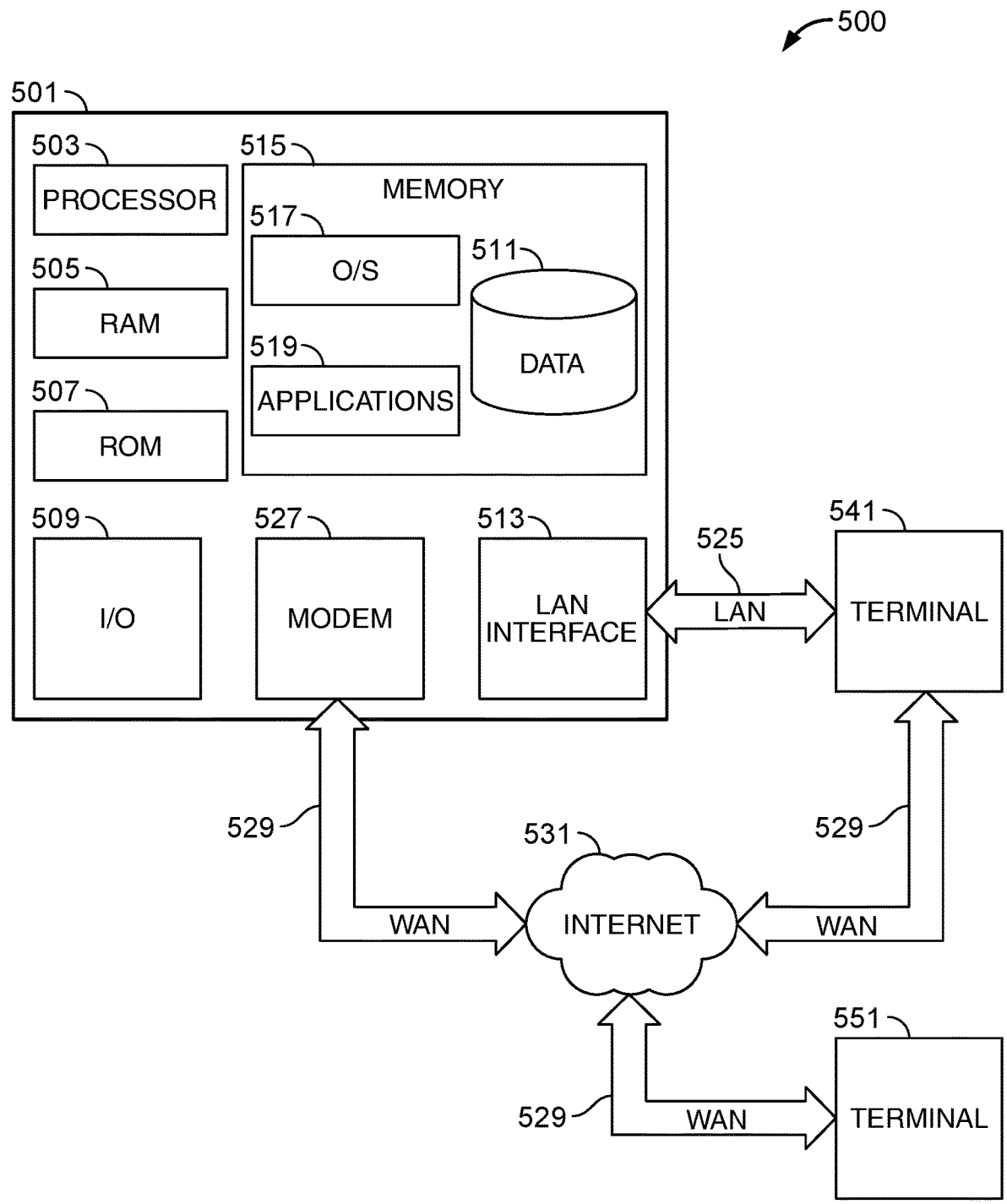
FIG. 5 shows an illustrative system in accordance with the principles of the disclosure.

FIG. 5 shows an illustrative block diagram of system 500 that includes computer 501. Computer 501 may alternatively be referred to herein as a "server" or a "computing device." Computer 501 may be a workstation, desktop, laptop, tablet, smart phone, ATM, satellite, or any other suitable computing device. Elements of system 500, including computer 501, may be used to implement various aspects of the systems and methods disclosed herein.

Computer 501 may have a processor 503 for controlling the operation of the device and its associated components, and may include RAM 505, ROM 507, input/output module 509, and a memory 515. The processor 503 may also execute all software running on the computer—e.g., the operating system and/or voice recognition software. Other components commonly used for computers, such as EEPROM or Flash memory or any other suitable components, may also be part of the computer 501.

Memory 515 may be comprised of any suitable permanent storage technology—e.g., a hard drive. The memory 515 may store software including the operating system 517 and application(s) 519 along with any data 511 needed for the operation of the system 500. Memory 515 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). Computer 501 may execute the instructions embodied by the software to perform various functions.

Input/output ("I/O") module may include connectivity to a microphone, keyboard, touch screen, mouse, and/or stylus through which a user of computer 501 may provide input. The input may include input relating to cursor movement. The input may relate to database backup, search, and recovery. The input/output module may also include one or more speakers for providing audio output and a video display device for providing textual, audio, audiovisual, and/or graphical output. The input and output may be related to computer application functionality. The input and output may be related to database backup, search, and recovery.

System 500 may be connected to other systems via a local area network ("LAN") interface 513. System 500 may operate in a networked environment supporting connections to one or more remote computers, such as terminals 541 and 551. Terminals 541 and 551 may be personal computers or servers that include many or all the elements described above relative to system 500.

The network connections depicted in FIG. 5 include a LAN 525 and a wide area network ("WAN") 529 but may also include other networks. When used in a LAN networking environment, computer 501 is connected to LAN 525 through a LAN interface or adapter 513. When used in a WAN networking environment, computer 501 may include a modem 527 or other means for establishing communications over WAN 529, such as Internet 531.

It will be appreciated if the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 519, which may be used by computer 501, may include computer executable instructions for invoking user functionality related to communication, such as e-mail, Short Message Service ("SMS"), and voice input and speech recognition applications. Application program(s) 519 (which may be alternatively referred to herein as "plugins," "applications," or "apps") may include computer executable instructions for invoking user functionality related performing various tasks. The various tasks may be related to database backup, search, and recovery.

Computer 501 and/or terminals 541 and 551 may also be devices including various other components, such as a battery, speaker, and/or antennas (not shown).

Terminal 551 and/or terminal 541 may be portable devices such as a laptop, cell phone, Blackberry™, tablet, smartphone, or any other suitable device for receiving, storing, transmitting and/or displaying relevant information. Terminals 551 and/or terminal 541 may be other devices. These devices may be identical to system 500 or different. The differences may be related to hardware components and/or software components.

Any information described above in connection with database 511, and any other suitable information, may be stored in memory 515. One or more of applications 519 may include one or more algorithms that may be used to implement features of the disclosure, and/or any other suitable tasks.

The disclosure may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc., that perform tasks or implement abstract data types. The disclosure may also be practiced in distributed computing environments where tasks are performed by remote processing devices that are linked through a communications network. In a distributed computing environment, program modules may be in both local and remote computer storage media including memory storage devices.

Figure 6:
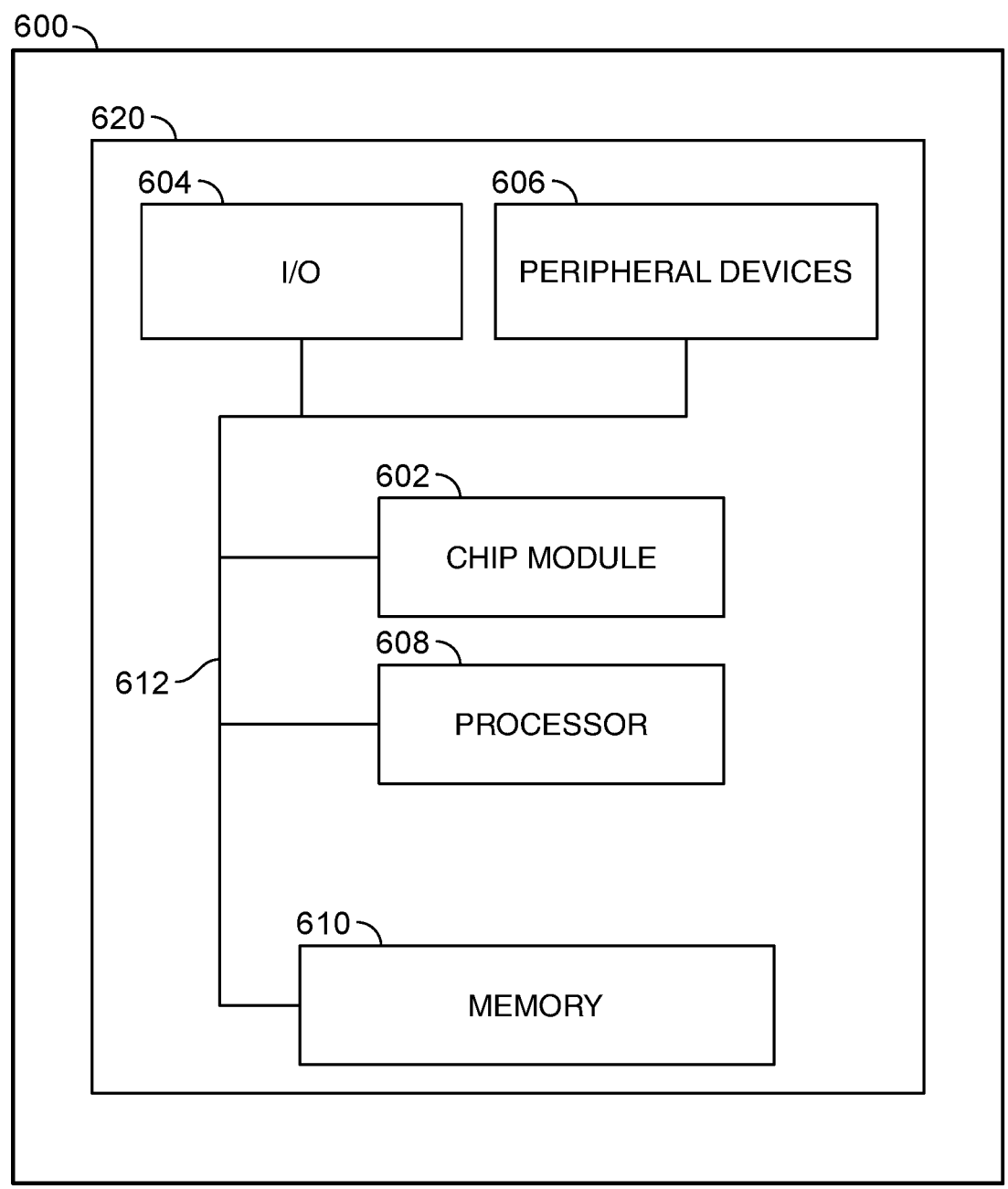
FIG. 6 shows illustrative information in accordance with the principles of the disclosure along with some of the system shown in FIG. 5.

FIG. 6 shows illustrative system 600 that may be configured in accordance with the principles of the disclosure. System 600 may be a computing machine. System 600 may include one or more features of the system shown in FIG. 5. System 600 may include chip module 602, which may include one or more integrated circuits, and which may include logic configured to perform any other suitable logical operations.

System 600 may include one or more of the following components: I/O circuitry 604, which may include a transmitter device and a computer device and may interface with fiber optic cable, coaxial cable, telephone lines, wireless devices, PHY layer hardware, a camera/display control device or any other suitable media or devices; peripheral devices 606, which may include counter timers, real-time timers, power-on reset generators or any other suitable peripheral devices; logical processing device 608, which may compute data structural information and structural parameters of the data; and machine-readable memory 610.

Machine-readable memory 610 may be configured to store in machine-readable data structures: machine executable instructions (which may be alternatively referred to herein as "computer instructions" or "computer code"), applications, signals, and/or any other suitable information or data structures.

Components 602, 604, 606, 608 and 610 may be coupled together by a system bus or other interconnections 612 and may be present on one or more circuit boards such as 620. In some embodiments, the components may be integrated into a single chip. The chip may be silicon-based.

Thus, systems and methods for providing optimized questions in an AI customer service interaction between a customer service agent and a customer in an AI session are provided. Persons skilled in the art will appreciate that the present invention can be practiced by other than the described embodiments, which are presented for purposes of illustration rather than of limitation. The present invention is limited only by the claims that follow.

What is claimed is:

1. A system for supporting an artificial intelligence ("AI") customer service interaction between a customer service agent and a customer, the system comprising:
   an AI platform; and
   an AI customer device, the AI customer device comprising a computer processor, and an AI graphical user interface ("GUI"), the computer processor running an AI application that is in communication with the AI platform;
   wherein:
   the AI application is configured to activate a customer AI session by:
      receiving a request from the AI platform for a set of know your customer ("KYC") information;
      displaying input fields on the GUI for receiving the requested set of KYC information; and
      transmitting information input into the input fields to the AI platform;
   the AI platform is configured to authenticate a customer associated with the AI customer device by:
      transmitting a one-time password ("OTP") to the AI customer device;
      receiving from the AI customer device an entered OTP;
      retrieving, upon OTP authentication, a first list of AI questions;
      selecting a first AI question from the first list of AI questions;
      transmitting the first AI question to the AI customer device;
      receiving from the AI customer device a first answer to the first AI question;
      authenticating the customer based on the first answer;
      creating, in response to a customer authentication, a payload that includes session elements;
      encrypting non-public information ("NPI") session elements included in the session elements;
      transmitting the payload to the AI customer device;
   the AI application is configured to authenticate the customer associated with the AI customer device by:
      decrypting the NPI session elements included in the session elements within the payload;
      instantiating a first co-browsing AI session between the customer and the customer service agent, on the AI customer device and the AI platform, the AI platform instructing the AI application regarding the first co-browsing AI session;
      transmitting a login session request to a customer authentication engine operating on the AI platform, the login session request comprising a plurality of authentication parameters; and
   the AI platform is further configured to authenticate the customer associated with the AI customer device by:
      authenticating the login session request via the customer authentication engine;
      transmitting to the AI application an authentication confirmation, including the NPI session elements, the first list of AI questions, and the first answer;
      retrieving a second list of AI questions based on the NPI session elements, the first list of AI questions, and the first answer;
      selecting a second AI question from the second list of AI questions;
      transmitting the second AI question to the AI customer device;
      retrieving a second answer to the second AI question from the AI customer device;
      authenticating the customer based on the second answer; and
      instantiating a second co-browsing AI session between the customer and the customer service agent.

2. The system of claim 1, wherein the second co-browsing AI session between the customer and the customer service agent prompts the customer to provide at least one of a wire transfer, in-session attestation, enter information, upload documentation, and submit an application.

3. The system of claim 1, wherein a display frame shared during the first and second co-browsing AI sessions between the customer and the customer service agent includes two frames, a first frame for the customer service agent and a second frame for the customer, the NPI session elements are masked in the first frame, while the NPI session elements are viewable in the second frame.

4. The system of claim 3, wherein, when there are additional customer service agents and customers added to the first and second co-browsing AI sessions between the customer and the customer service agent, each is assigned a personal frame, the personal frame enables viewing of a portion of the NPI session elements based on a permission set and permission-based hierarchy.

5. The system of claim 1, wherein if the authenticating the customer based on the first answer fails:
   the AI platform is further configured to authenticate the customer associated with the AI customer device by:
      transmitting the first list of AI questions to the AI customer device, wherein a sequence and content of the first list of AI questions are determined by an AI algorithm, said AI algorithm determining a content of each of later-in-list AI questions based on an answer received from an earlier-in-list AI question;
      receiving from the AI customer device a first list of answers to the first list of AI questions; and
      authenticating the customer based on the first list of answers.

6. The system of claim 1, wherein if the authenticating the customer based on the second answer fails:
the AI platform is further configured to authenticate the customer associated with the AI customer device by:
transmitting the second list of AI questions to the AI customer device, wherein a sequence and content of the second list of AI questions are determined by an AI algorithm, said AI algorithm determining a content of each of later-in-list AI questions based on an answer received from an earlier-in-list AI question;
receiving from the AI customer device a second list of answers to the second list of AI questions; and
authenticating the customer based on the second list of answers.

7. The system of claim 1, wherein the payload is decrypted at the AI customer device using the OTP.

8. The system of claim 1, wherein upon activation, further communications involve creating a bank account.

9. The system of claim 8, wherein upon detection of a security failure, a reactivation is requested, and the customer is barred from AI communications until the reactivation is executed.

10. The system of claim 1, wherein upon activation and authentication, further communications involve applying for a mortgage.

11. The system of claim 10, wherein upon detection of a security failure, a reactivation and reauthentication are requested and the customer is barred from AI communications until the reactivation and reauthentication are executed.

12. A method for supporting an artificial intelligence ("AI") customer service interaction between a customer service agent, operating on an AI platform, and a customer using an AI customer device, the AI customer device running an AI application, the AI application enabling communication between the AI customer device and the AI platform, the method comprising:
activating, at the AI application, a customer AI session by:
requesting a set of know your customer ("KYC") information;
receiving the set of KYC information; and
transmitting the set of KYC information to the AI platform;
authenticating, at the AI platform, the customer by:
transmitting a one-time password ("OTP") to the AI customer device;
receiving from the AI customer device an entered OTP;
authenticating the OTP;
retrieving a first list of AI questions;
selecting a first AI question from the first list of AI questions,
transmitting the first AI question from the AI platform to the AI customer device;
receiving a first answer to the first question from the AI customer device;
authenticating the customer based on the first answer;
creating a payload that includes a plurality of session elements;
encrypting non-public information ("NPI") session elements included in the plurality of session elements;
transferring the payload to the AI customer device;
authenticating, at the AI application, the customer by:
decrypting the NPI session elements included in the session elements within the payload;
instantiating a first co-browsing AI session between the customer and the customer service agent, on the AI customer device and the AI platform, the AI platform instructing the AI application regarding the first co-browsing AI session;
transmitting a login session request to a customer authentication engine operating on the AI platform, the login session request comprising a plurality of authentication parameters; and
authenticating, at the AI platform, the customer by:
authenticating the login session request via the customer authentication engine;
transmitting to the AI application an authentication confirmation, including the NPI session elements, the first list of AI questions, and the first answer;
retrieving a second list of AI questions based on the NPI session elements, the first list of AI questions, and the first answer;
selecting a second AI question from the second list of AI questions;
transmitting the second AI question to the AI customer device;
retrieving a second answer to the second AI question from the AI customer device;
authenticating the customer based on the second answer; and
instantiating a second co-browsing AI session between the customer and the customer service agent.

13. The method of claim 12, wherein the set of KYC information is received at the AI customer device via information input into the AI customer device.

14. The method of claim 12, further including prompting the customer to provide one or more of a wire transfer, in-session attestation, enter information, upload documentation, and submit an application, during the second co-browsing AI session between the customer and the customer service agent.

15. The method of claim 12, further including:
masking the NPI session elements, included in the first co-browsing AI session between the customer and the customer service agent, for the customer service agent; and
making viewable the NPI session elements, included in the first co-browsing AI session between the customer and the customer service agent, for the customer.

16. The method of claim 12, wherein if the authenticating the customer based on the first answer fails:
transmitting the first list of AI questions to the AI customer device, wherein a sequence and content of the first list of AI questions are determined by an AI algorithm, said AI algorithm determining a content of each of later-in-list AI questions based on an answer received from an earlier-in-list AI question;
receiving from the AI customer device a first list of answers to the first list of AI questions; and
authenticating the customer based on the first list of answers.

17. The method of claim 12, wherein if the authenticating the customer based on the second answer fails:
transmitting the second list of AI questions to the AI customer device, wherein a sequence and content of the second list of AI questions are determined by an AI algorithm, said AI algorithm determining a content of each of later-in-list AI questions based on an answer received from an earlier-in-list AI question;
receiving from the AI customer device a second list of answers to the second list of AI questions; and
authenticating the customer based on the second list of answers.

18. The method of claim 12, wherein upon activation, further communications involve creating a bank account.

19. The method of claim 18, wherein upon a security failure, a reactivation is requested, and the customer is barred from AI communications until the reactivation is executed.

20. The method of claim 12, wherein upon activation and authentication, further communications involve applying for a mortgage.

\* \* \* \* \*